Jan. 4, 1927.

C. D. DUNNING 1,613,163

METHOD OF PRODUCING COMPOSITE PHOTOGRAPHS

Filed April 17, 1926

INVENTOR,
Carroll D. Dunning;
BY
Blakeslee Brown
ATTORNEYS.

Patented Jan. 4, 1927.

1,613,163

UNITED STATES PATENT OFFICE.

CARROLL D. DUNNING, OF LOS ANGELES, CALIFORNIA.

METHOD OF PRODUCING COMPOSITE PHOTOGRAPHS.

Application filed April 17, 1926. Serial No. 102,722.

This invention relates to method and means of producing composite photographs. The building of scenes for the taking of motion pictures entails great expense, particularly if the actors must appear on such scenes and the said scenes be full-sized. Accordingly, if an icebound scene were desired, transportation of actors to a given location for the taking of such a scene would be very expensive and possibly hazardous to the actors. If a given expedition is taken by camera men and the different scenes photographed during the journey, the film can be classified for future use when it is desired to have certain action in such scenes, and without the actors actually being present on the location. For instance, an actor can appear on the film which is projected on a motion picture screen as hunting in the wilds of Africa, when, as a matter of fact the actor would be thousands of miles from any such location. The inventor is aware that various means are now used, some of which are satisfactory, for accomplishing the very objects set forth; but such means usually include glass plates upon which scenes have been painted and the actors must confine their action within certain defined limits so that the camera can photograph not only the scene that appears upon the glass, but beyond the glass, so as to include the actors. My invention contemplates a novel method of producing composite photographs wherein a given scene can be first photographed, then the film upon which such scene or scenes have been photographed, placed in front of panchromatic film and the action photographed. The result will be that when the panchromatic film is developed and printed the actors will appear upon the given scene. This is an extremely simple method and one that proves highly satisfactory in practice.

Furthermore, the invention produces a perfect photograph without phantom.

The invention has for an object the provision of a novel method, as well as means for taking composite photographs without phantom,—a method which is extremely simple and inexpensive, and which will produce superior results.

I have illustrated one method of carrying out my invention on the drawing wherein—

Figure 1:
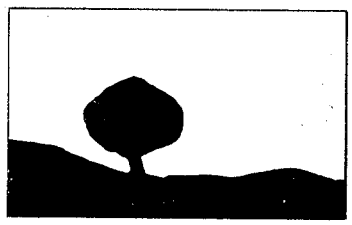
Figure 1 is representative of the original scene.
Figure 2:
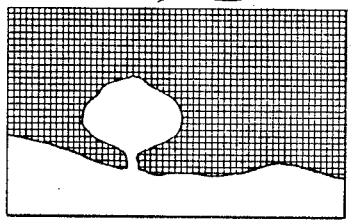
Figure 2 is a negative taken of such scene.
Figure 3:
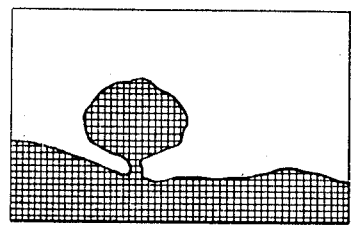
Figure 3 is a positive after developing the negative of Figure 2.
Figure 4:
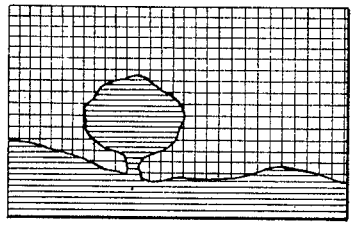
Figure 4 is a positive of Figure 3 which has been toned and dipped.
Figure 5:
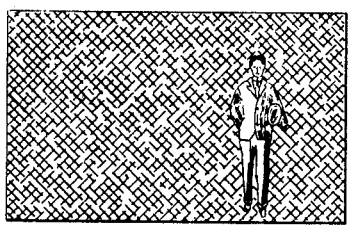
Figure 5 shows the original action as it would appear.
Figure 6:
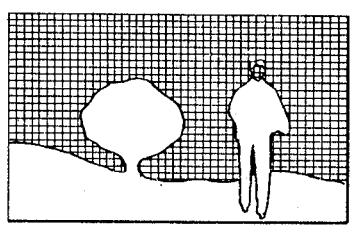
Figure 6 is a negative of the original action plus the scene.
Figure 7:
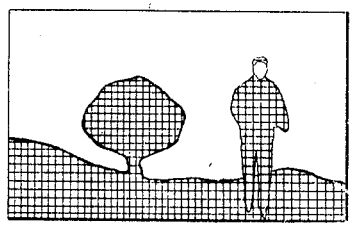
Figure 7 is a positive of Figure 6.

I first take a scene upon which action is to be disposed and if it is assumed that the scene comprises a landscape upon which appears a tree, as shown in Figure 1, this landscape is photographed, which will produce a negative in which the landscape and tree are in white and the back-ground black or some shade of gray, as is customary. The negative is developed which will produce the positive in Figure 3, in the ordinary manner. This positive is then dye-toned and tinted. In other words, dye-toning will consist in replacing the silver salts of the scene with some chemical of a certain color, and in the present instance we will assume that the landscape plus the tree is blue toned. The film is then dipped so that the sky portion is of some neutral shade, such as gray. As an example, after the black and white positive of Figure 3 is toned so that the silver salts are a blue color, the film is dried, and then that portion wherein the silver salts are absent is dyed by dipping the film into a solution of nigrosine which gives a gray tint. This gray tint given the film will have the same photographic value to white light as the blue. This film, assuming it is a motion picture film, is now placed on a reel and a second reel of unexposed panchromatic film, in the case of motion picture work this film is of course strip film, is ready to be fed rearwardly of the first film, when the action is ready to be taken. Assuming that the action consists of a man, as shown in Figure 5, it will be essential that such action should be of any color other than shades of red and yellow which are complementary to the toned scene of Fig. 4. However, the back-ground of the action should be approximately complementary to such toned scene of Fig. 4, and in this instance the back-ground would be yellow, as indicated by the criss-cross lines of Fig. 5. When the action is photographed onto the panchromatic film through the toned and dyed film of Fig. 4, a negative will appear such as shown in Figure 6. This is true for the reason that the toned and dyed positive, as shown in Fig. 4 has no value as to separation of any color other than yellow and red, and as there was no yellow and red in the action the action will appear upon the landscape. The back-ground will of course be printed into the scene, as shown in Figure 7, because the blue of the scene stops out the yellow, but the gray being neutral, allows the yellow to pass.

It will be evident that only one frame of an original scene may be used and that this frame may be placed either in front of or behind the lens system of the camera. This original scene must of course be colored, as has been described, or the scene may be directly painted on glass or some other transparency in colors, and does not of necessity have to be a film. The panchromatic film is of course placed rearwardly of the painted scene, the action being photographed the same as before. It is evident that the effect of complementary colors, or that filter effect is used in the present invention, but the so-called filter effect is obtained by directly coloring the scene, although it might of course be obtained by use of filters placed in front of the positive of Figure 3. However, it has been found that it is very satisfactory to directly tone and dip the positive of Fig. 3, as previously described. The obtaining of colored back-grounds for an action is comparatively simple, as the actors may perform before a yellow screen. Of course it is realized that other colors may be used, depending upon the character of the action, the principle being to keep the back-ground of the scene of a certain shade or color on one film, and then have the back-ground of the action scene complementary thereto with the action members dressed or painted a color complementary to their own back-ground. In other words, the color of the action in front of the back-ground of Fig. 5 should be a color not complementary to the toned part of the frame of Fig. 4. Thus, the action might be red and the background might be blue, in which instance the positive of Figure 3 would be dye-toned a red with varying shades of red or yellow for the background of such positive of Figure 3. Various combinations may of course be worked out, so long as the principle of the present method of composite photography is kept in mind.

It will be understood that in any black and white positive in which the present method is used, the high lights are given a neutral shade and the shadow portions dye-toned.

Having thus disclosed my invention, I claim and desire to secure by Letters Patent:

1. The method of producing composite photographs which consists in taking a developed positive in which the shadows are toned a certain color, and the high lights given a neutral shade, placing said film in front of an unexposed film, then exposing the two films to a given scene having action thereon and which has a background of a color approximately complementary to the color of the first film with the action complementary or neutral to its back-ground.

2. The method of producing composite photographs which consists in first taking a given scene on developed positive, developing and printing the same, then dye-toning the shadows a given color and then dipping the film to give the high lights a neutral shade, placing this film so toned and dyed in front of unexposed panchromatic film, then exposing the two films to a scene having action thereon and wherein the background has a color approximately complementary to the toned and dyed image of the first film, and the action of which is not complementary to the dye-toned image of the developed positive.

3. The method of producing composite photographs which consists in first taking a given scene on developed positive, developing and printing the same, then dye-toning the shadows a given color and then dipping the film to give the high lights a neutral shade, placing this film so toned and dyed in front of unexposed panchromatic film, then exposing the two films to a scene having action thereon and wherein the back-ground has a color approximately complementary to the toned and dyed image of the first film and the action is not complementary to the toned and dye-image of the said first film, then printing said panchromatic film.

4. The method of producing composite photographs which consists in providing a developed positive upon which the shadows are dye-toned a certain color, and the high lights given a neutral shade, placing this film forwardly of an unexposed film, then exposing the two films to a scene the background of which is approximately complementary to the color of the first film, and the action of such scene having colors complementary to its back-ground.

5. The method of producing composite photographs which consists in taking a member upon which is a scene, the scene of which has the shadows of certain color, and the high lights a neutral color, placing said member in front of an unexposed photographic film, then exposing the said film to a given scene having action thereon and the scene of which has a back-ground of a color approximately complementary to the color of the shadows of the first member with the action of said scene complementary or neutral to its back-ground.

In testimony whereof, I have signed my name to this specification.

CARROLL D. DUNNING.